United States Patent Office 3,769,437
Patented Oct. 30, 1973

3,769,437
PREPARATION OF ALCOHOLIC BEVERAGES
FROM OIL SEED WHEY
Akiva Pour-el, St. Paul, Minn., and Gollamudi Venka
Reddy, Decatur, Ill., assignors to Archer Daniels
Midland Company, Decatur, Ill.
No Drawing. Filed Feb. 25, 1971, Ser. No. 118,959
Int. Cl. C12g 1/00
U.S. Cl. 426—11
9 Claims

ABSTRACT OF THE DISCLOSURE

Alcoholic beverages are produced by fermenting with alcohol producing yeast under anaerobic conditions a mixture containing oil seed whey obtained as a waste material from the isolation of oil seed protein, and a carbohydrate.

---

This application relates to a process for production of alcoholic beverages by utilizing waste products. More specifically, the waste materials are wheys recovered from processes involving isolation of protein from seed materials, especially soybeans, as a food for alcohol-producing yeast.

As more and more seed protein isolates and protein concentrates are utilized for human consumption, there is an accumulation of seed protein whey as a waste material from these processes. Previously the wheys were discarded, however before discarding it was necessary to purify the wheys before dumping them into a sewage system. In view of the growing necessity for further purification of waste materials, the previously experienced cost is expected to rise if such materials are discarded.

According to the present invention, a process is provided which not only utilizes the whey as a by-product from the protein isolation to produce a valuable product but also eliminates the cost required to dispose of the wheys and further contributes to improving the environment.

Generally the method utilized according to this invention comprises recovering the seed whey which is produced by any conventional process involving isolating insoluble material produced in the processing of seeds, particularly by acidic wash of seed materials or by the isoelectric point separation of globulins from extracts of these materials, especially soybeans. This seed "whey" is then mixed with a carbon source.

The carbon source is any carbohydrate which is, e.g., a mono-saccharide or a di-saccharide or any breakdown products of polysacchararides which is utilizable by the yeast, e.g., sucrose or glucose. This mixture generally consists of ⅓ carbohydrate by weight. It is possible to add all the carbon source at the initiation of fermentation or add it intermittently during fermentation.

The mixture is then sterilized and innoculated with the yeast culture. The yeast culture is any species of Saccharomyces which produces alcohol as a byproduct of its metalbolism. Particularly, it is found that the species *Saccharomyces diastaticus* or *Saccharomyces cerivisciae* which has been pregrown on a rich whey and sucrose mixture under incubation, are valuable in the process.

After innoculation of a preferably sterilized or pasteurized whey the incubation proceeds anaerobically as is typical in alcohol fermentations. The incubation continues with or without intermittent agitation for two to eight weeks, preferably four weeks, at 65–95° F., preferably at room temperature, until the sugar (carbohydrate) content is reduced to less than 1%.

This product can then be utilized in various ways. First, the mixture can be clarified, e.g. by centrifuging and aging to produce wine (10–20% alcohol) or it can be distilled to produce wines of higher alcoholic content and having the flavor characteristic which is due to the oil seed material from which it was produced. Alternatively, the mixture after incubation can be distilled directly without clarification but with better temperature control to produce a high alcohol content distillate (50–70%). This distillate can be aged with 1–2% charcoal in a known manner to form a whisky-like material (50–70% alcohol). A further use is to add more sugar to the distillate produced under the alternate procedure mentioned above and then age this mixture to produce a liqueur (40–60% alcohol).

By way of explanation of the mechanism involved, the whey in the raw material contributes its proteins and carbohydrates as a food for the yeast, whereby the proteins are converted into various materials which affect the final taste of the beverage. The other components of the whey, beside the protein material, such as flavor materials, and the mineral content of the whey is utilized by the yeast in its growth. By reason of the advantageous combination of constituents in the whey, the only additive necessary for the fermentation process to allow the yeast to grow is a further source of carbon, that is the sugar or poly-saccharide breakdown products.

The fermentation process is well-known and has been used for centuries to produce alcoholic beverages from various raw materials. However, as is apparent, each raw material contributes its own unique flavor and characteristics to the ultimate beverage produced. Accordingly, the alcoholic beverage based on oilseed wheys is unique and pleasant to the taste. The particular steps utilized in the fermentation process and in the subsequent conversion to either a wine, whisky or brandy-type drink are those conventionally used in the art, although the particular conditions and mechanism are unique to oilseed wheys.

To better explain the invention, the following examples are provided.

EXAMPLE 1

300 g. of soybean flour (commercially available as Nutrisoy 7–B) were dispersed in 3,000 ml. of water and sonicated for complete mixing. The insolubles were centrifuged off and the supernatant liquid brought to pH 4.75 with hydrochloric acid to precipitate the globulins. These were centrifuged off to prepare a clear supernate—the whey. 10 ml. of this whey with a 1 g. of sucrose were used to prepare an inoculum with *Saccharomyces cerivisciae* ATTCC #7921. The inoculum was left for 24 hours at 37° C. after which it was used to inoculate 1000 ml. of the whey to which 50 g. of sucrose were added in an Erlenmeyer flask. The sweetened whey was preheated to sterilize the mixture and after inoculation the whole was incubated at room temperature for two months under anaerobic conditions. At the end of these two months the mixture was centrifuged and the clear supernate distilled to collect the volatiles at 170–190° F. This distillate had a very pleasant fruity odor. Fifty ml. was the yield.

EXAMPLE 2

150 g. of soy flakes (commercially available as Nutrisoy 7–B) were extracted with 3,000 ml. of water at 105° F. and pH 8.5 by mixing for 40 minutes. The mixture was filtered and centrifuged to eliminate the insolubles. The supernatant was adjusted to pH 4.6 with $H_2SO_4$ and the precipitated curd separated from the whey by centrifugation. The curds were washed twice with 500 ml. of water and the washings combined with the whey. Total volume was 3,850 ml. of whey.

2,000 ml. of the whey were mixed with 500 g. of wheat milling rejects (Red Dog) and the mixture, after adjusting the pH to 5.4 with $H_2SO_4$ was heated at 192° F. for 50 minutes. The temperature was then brought down to 122° F. and 0.2 g. of diastase enzyme added. The temperature was held constant for 30 minutes with continuous mixing. The temperature was then raised to 145° F. and held constant for 30 minutes, and then boiled for 30 minutes. The mixture was cooled to 130° F. and another 0.2 g. of diastase added and the mixture slowly cooled (30 minutes) to 110° F. The mixture was then cooled to 86–90° F. and 3 g. of Baker's yeast dissolved in 50 ml. of lugewarm water was added. The mixture was mixed well at 68–70° F. without allowing air to come in contact with the mixture. The fermentation mixture was shaken intermittently and allowed to proceed for one week. The fermentation was then left standing without shaking for another two weeks. The mixture was then distilled, the distillate coming off at 80–90° C. This distillate was redistilled and the clear distillate coming off at 70–80° C. contained 63% alcohol. This distillate was divided in two portions—to one portion 2 g. of charcoal were added; to the other portion, nothing was added. Both were stored in the refrigeratior for 3–4 months after which both exhibited whisky-like characteristics of odor and flavor. The one with charcoal had the more mellow flavor than the one without charcoal. Both flavors had unique characteristics attributable to soy products. Yield was 500 ml.

EXAMPLE 3

Example 2 was repeated using, instead of 500 g. of Red Dog wheat, 300 g. Wheat Middlings to produce the 2,000 ml. of whey. The final yield was lower.

EXAMPLE 4

Soybean flakes (commercially available as Nutrisoy 7–B) were extracted at pH 9.6 for one and one-half hours with 20 times their weight of water. The insolubles were centrifuged off and the supernatant was clarified in super centrifuge. The supernate was then brought to pH 4.7 with hydrochloric acid and the precipitated curds separated from the clear supernate whey. The whey was pasteurized in known manner.

2,000 ml. of pasteurized whey were mixed with 5% cerelose and 5% sucrose (w./v.). A yeast culture of *Saccharomyces diastaticus* was introduced and the mixture maintained at a temperature of 88–90° F. under anaerobic conditions for 30 days. At the end of this time 500 ml. of the clear upper liquid was separated and distilled, the distillate coming off at 170° F. 50 ml. were collected. This was divided in two halves; to one half 1% charcoal was added. Both were then left to age in the refrigerator for two months at the end of which both exhibited distinct whisky-like flavors and odors with a unique character attributable to soy products.

EXAMPLE 5

To 2 l. of pasteurized whey 20 g. of cerulose and 10 g. of sucrose were added (w./v.). Culture was added as in Example 3. At the end of 30 days a 500 ml. sample was filtered, pasteurized and left under refrigeration with a clarifying agent. The rest of the sample was distilled and 10% of the distillate came off at 170° F. This was stored for aging with 1% charcoal in it. The clarified refrigerated sample exhibited "dry wine" characteristics with a slight bitterish taste unique to soy products. The distillate, after aging, exhibited whisky-like characteristics.

What is claimed is:

1. A method of making an alcoholic beverage which comprises mixing an oil seed "whey" obtained as a waste material from the isolation of oil seed protein, a carbohydrate, and a species of Saccharomyces yeast culture together; incubating the mixture at 65–95° F. under anaerobic conditions until the sugar content is about 1% by weight of the mixture and the alcoholic content is from about 10% to about 20%; and recovering an alcoholic product.

2. The process of claim 1 wherein the oilseed whey is soybean whey.

3. The process of claim 1 wherein the product recovered is additionally distilled to yield a concentration of approximately 50–70% alcohol and is aged with charcoal.

4. The process of claim 1 wherein the product is distilled to yield a distillate having about 50–70% alcohol and is aged in the presence of sugar.

5. Process of claim 1 wherein incubation occurs for a period of from about 2 to about 8 weeks.

6. Process of claim 5 wherein the medium is intermittantly agitated.

7. An alcoholic beverage produced by the process of claim 1.

8. An alcoholic beverage produced by the process of claim 3.

9. An alcoholic beverage produced by the process of claim 4.

References Cited

UNITED STATES PATENTS 1,957,375   5/1934   Vingethoets _____ 99—35 X

FOREIGN PATENTS 669,894   4/1952   Great Britain _____ 99—30

OTHER REFERENCES

Markley, K. S.: Soybeans and Soybean Products, vol. I, Interscience Publishers, Inc., N.Y., 1950 (pp. 308–313).

Sakamoto, et. al.: Microbial Proteases and Their Utilization. Chemical Abstracts, vol. 63, 1965 (p. 16829(a)).

Amefine et al.: The Technology of Wine Making. 2nd ed. The Avi Publ. Co. Inc., Westport, Conn., 1967 (pp. 600–609 and 637–657).

Falanghe, et al.: Production of Fungal Mycelial Protein in Submerged Culture of Soybean Whey. Applied Microbiology, vol. 12, No. 4, 1964 (pp. 330–334).

DAVID M. NAFF, Primary Examiner

U.S. Cl. X.R.

426—192, 494, 365